(12) United States Patent
Shivanna et al.

(10) Patent No.: US 11,218,463 B2
(45) Date of Patent: Jan. 4, 2022

(54) TRUST ESTABLISHMENT TO DEPLOY SERVERS IN DATA CENTERS

(71) Applicant: HEWLETT PACKARD ENTERPRISE DEVELOPMENT LP, Houston, TX (US)

(72) Inventors: Suhas Shivanna, Bangalore (IN); Alan L Goodrum, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 537 days.

(21) Appl. No.: 15/656,788

(22) Filed: Jul. 21, 2017

(65) Prior Publication Data
US 2018/0041496 A1 Feb. 8, 2018

(30) Foreign Application Priority Data

Aug. 2, 2016 (IN) .............................. 201641026312

(51) Int. Cl.
*H04L 29/06* (2006.01)
*H04L 9/32* (2006.01)

(52) U.S. Cl.
CPC ........ *H04L 63/0823* (2013.01); *H04L 9/3247* (2013.01); *H04L 9/3263* (2013.01); *H04L 63/0442* (2013.01); *H04L 63/0838* (2013.01); *H04L 63/0853* (2013.01); *H04L 63/162* (2013.01); *H04L 63/123* (2013.01); *Y02D 30/00* (2018.01)

(58) Field of Classification Search
CPC ............... H04L 63/0823; H04L 63/083; H04L 63/0838; H04L 63/0876; H04L 63/12; H04L 63/123; H04L 63/162; H04L 63/0442; H04L 63/0428; H04L 9/3247; H04L 9/3263; Y02D 30/30
See application file for complete search history.

(56) References Cited

U.S. PATENT DOCUMENTS 6,891,953 B1 * 5/2005 DeMello ................. G06F 21/10
380/259
7,613,807 B2 * 11/2009 Lahiri ................. H04L 41/0213
709/225
7,865,577 B1 * 1/2011 O'Neil ............... H04L 41/0809
709/220

(Continued)

OTHER PUBLICATIONS

Automic Software, Inc., "Automated Server Provisioning with Automic," May 29, 2015, pp. 1-3 [online], Retrieved from the Internet on Apr. 20, 2016 at URL: <http://automic.com/server-middleware>.

*Primary Examiner* — Zachary A. Davis
(74) *Attorney, Agent, or Firm* — Hewlett Packard Enterprise Patent Department (57) ABSTRACT

In one example, a system is disclosed, which may include a network device, a new server connected to the network device, and a management server communicatively connected to a cloud-based service and the network device. The management server may include a server deployment engine to discover the new server in the system using the network device; obtain an encrypted data blob associated with the new server from the cloud-based service; establish a trust, via a secure protocol, with the new server using the encrypted data blob; and deploy the new server in the system upon establishing the trust with the new server.

19 Claims, 7 Drawing Sheets

(56) References Cited

U.S. PATENT DOCUMENTS

| | | |
|---|---|---|
| 8,302,167 B2 | 10/2012 | Mennes et al. |
| 9,043,884 B2 * | 5/2015 | Behringer ............. H04L 63/105 |
| | | 726/2 |
| 9,172,605 B2 * | 10/2015 | Hardy ................. H04L 41/0806 |
| 9,219,607 B2 | 12/2015 | Nakhjir |
| 9,220,012 B1 * | 12/2015 | Inamdar ................ H04W 12/08 |
| 9,330,250 B2 * | 5/2016 | Medvinsky ............. G06F 21/44 |
| 10,169,587 B1 * | 1/2019 | Nix ......................... G06F 21/57 |
| 2002/0120868 A1 | 8/2002 | Hay et al. |
| 2006/0095505 A1 | 5/2006 | Zimmer et al. |
| 2013/0031227 A1 * | 1/2013 | Ford ................. H04L 12/40019 |
| | | 709/222 |
| 2016/0366185 A1 * | 12/2016 | Lee ......................... H04L 63/20 |

* cited by examiner

TRUST ESTABLISHMENT TO DEPLOY SERVERS IN DATA CENTERS

BACKGROUND

Many organizations may utilize data centers to provide centralized computational and/or storage services. Data centers may provide a facility that may be used to run the computer-based applications that handle the core business and operational data of organizations. Data centers may host large numbers of network servers, storage devices, network switches and other equipment.

BRIEF DESCRIPTION OF THE DRAWINGS

Examples are described in the following detailed description and in reference to the drawings, in which.

DETAILED DESCRIPTION

In order to deploy/provision a new server in a data center, a data center administrator may manually read a password and server credentials (e.g., a serial number and unique identifier) shipped as part of the new server and then provision the new server in the data center using the password and server credentials via a management engine in a management server. For example, the password and the new server credentials may be fed to a home grown database, may be used in a script as input or may be provided as input to management engines for adding the new server. In existing methods, a customer may opt for custom to order/factory express solution to configure a default password for the new servers or the vendor may ship the servers with a default password. Existing methods may be insecure, add cost due to custom to order/factory express process, and/or error prone due to manual process.

Examples described herein may establish a trust between a new server (e.g., a bare metal server) shipped from a factory and a server deployment module in a management server using a cloud-based service and a secure protocol. An example server may include a rack server, tower server, and other devices in the data center. Further, examples described herein may enable automation of the new server deployment in the data center upon establishing the trust between the new server and the server deployment engine.

In one example, the server deployment engine may discover the new server added in the data center using a network device connected to the new server. The server deployment engine may establish a trusted connection with the cloud-based service using a trusted certificate. The server deployment engine may obtain an encrypted signed data blob associated with the new server from the cloud-based service upon establishing the trusted connection. The encrypted signed data blob may include the encrypted data blob that may be signed by the cloud-based service using a cloud-based service private key.

In one example, during a manufacturing process of the new server, a data blob may be encrypted using the new server's own public key. Further, the new server may return the encrypted data blob for storing in the cloud-based service. Upon establishing the trusted connection, the cloud-based service may sign the encrypted data blob and send the encrypted signed data blob to the management server. The encrypted data blob may include a password and device credentials associated with the new server. Example device credentials may include a unique identifier, a random number or a combination thereof. The server deployment engine may send the encrypted signed data blob to the new server.

Further, the new server may include an authentication engine to receive the encrypted signed data blob from the server deployment engine. The authentication engine may verify a signature of the encrypted signed data blob using a corresponding cloud-based service public key shipped with the new server. The authentication engine may decrypt the encrypted data blob using a private key shipped with the new server upon verifying the signature of the encrypted signed data blob. The authentication engine may determine that the decrypted data blob includes a default password and device credentials associated with the new server. The authentication engine may enable the server deployment engine to establish the trust with the new server based on the determination.

Furthermore, the server deployment engine may establish the trust, via a secure protocol, with the new server in response to the new server authenticating the encrypted signed data blob. The server deployment engine may deploy the new server in the data center based on pre-defined rules (e.g., customer-defined rules) upon establishing the trust with the new server. In one example, the server deployment engine may send a onetime password to the new server upon establishing the trust with the new server, where the onetime password may be used to login and deploy the new server.

Examples described herein may enable a policy based automation of the new server deployment in a secure way. Examples described herein may eliminate the need for manual intervention like reading and updating management applications with the information present in the new server. Examples described herein may improve the customer experience for automating registration of new servers in data centers.

The terms "deploy" and "provision" may be interchangeably used throughout the document and may refer to a process of installing software and/or hardware on a new server (i.e., bare metal server shipped from a factory).

Figure 1A:
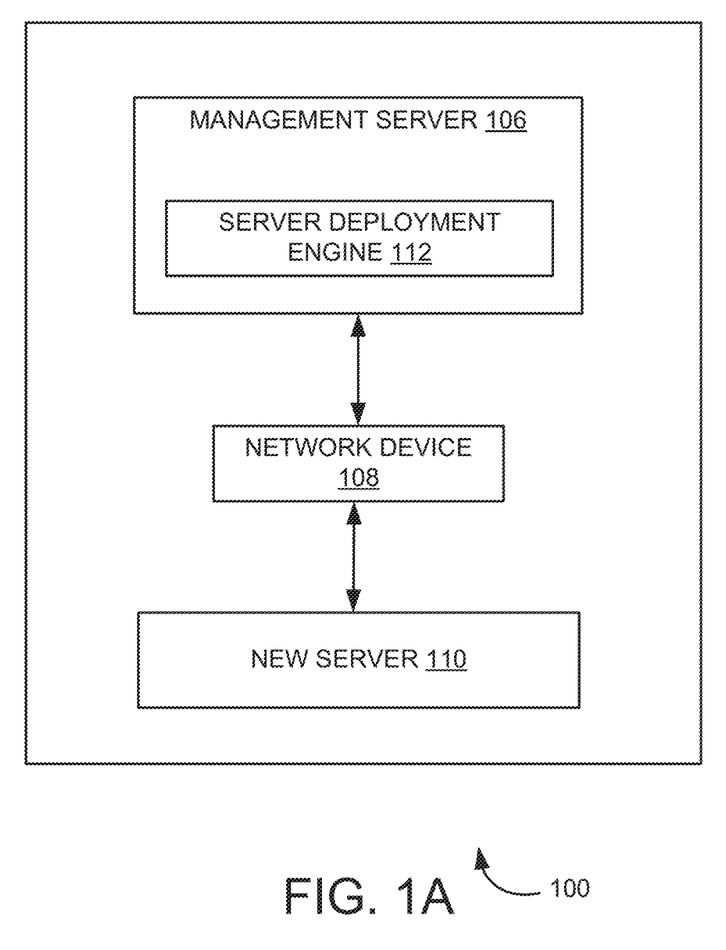
FIG. 1A is a block diagram of an example system, in which a new server can be deployed.

FIG. 1A is a block diagram of an example system 100, in which a new server 110 can be deployed. The system 100 may include a network device 108, the new server 110 connected (e.g., plugged in) to a network device 108, and a management server 106 communicatively connected to the network device 108. For example, the system 100 may be included within a data center, the system 100 may represent a single data center, and/or the data center may or may not include a cloud-based service. A management server 106 may include a server deployment engine 112 to automate provisioning of the new server 110 in the system 100. An example system 100 may be explained in detail in FIG. 1B.

Figure 1B:
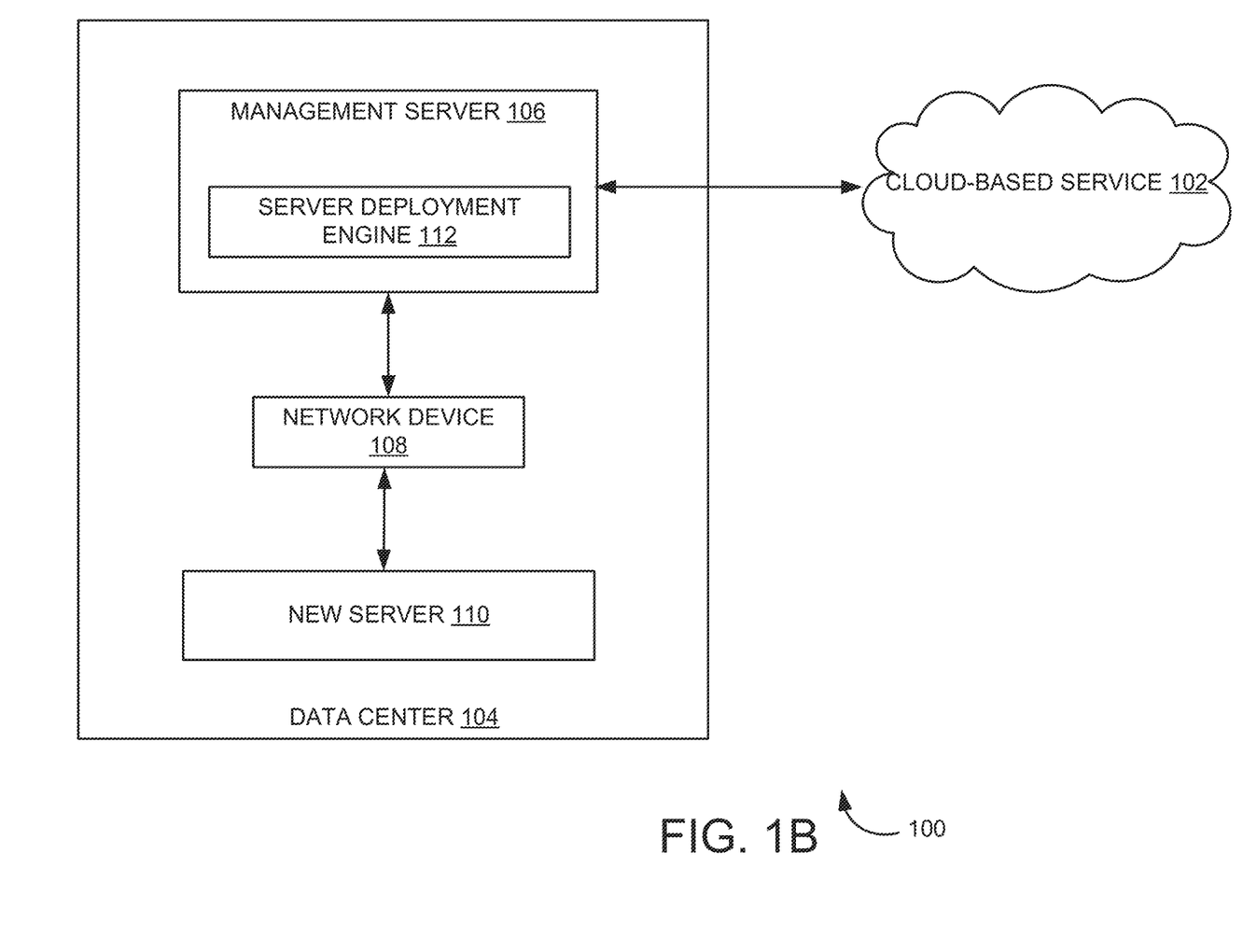
FIG. 1B is a block diagram of the example system of FIG. 1A, depicting a datacenter in which the new server can be deployed.

FIG. 1B is a block diagram of the example system 100 depicting a data center 104 in which the new server 110 can be deployed. The system 100 may include a cloud-based service 102 and the data center 104. A cloud-based service 102 may be a service that is available to the management server 106 on demand via a network connection. The cloud-based service 102 may store an encrypted data blob associated with the new server or may retrieve encrypted data blobs from a centralized storage server. In one example, the encryption of the data blobs may be performed using the server's own public key that could be generated during the manufacturing process of new server 110. Further, during the manufacturing process, the new server 110 may return the encrypted data blob for storing in the cloud-based service 102 or send the encrypted data blob to a centralized storage server for later access.

Figure 2:
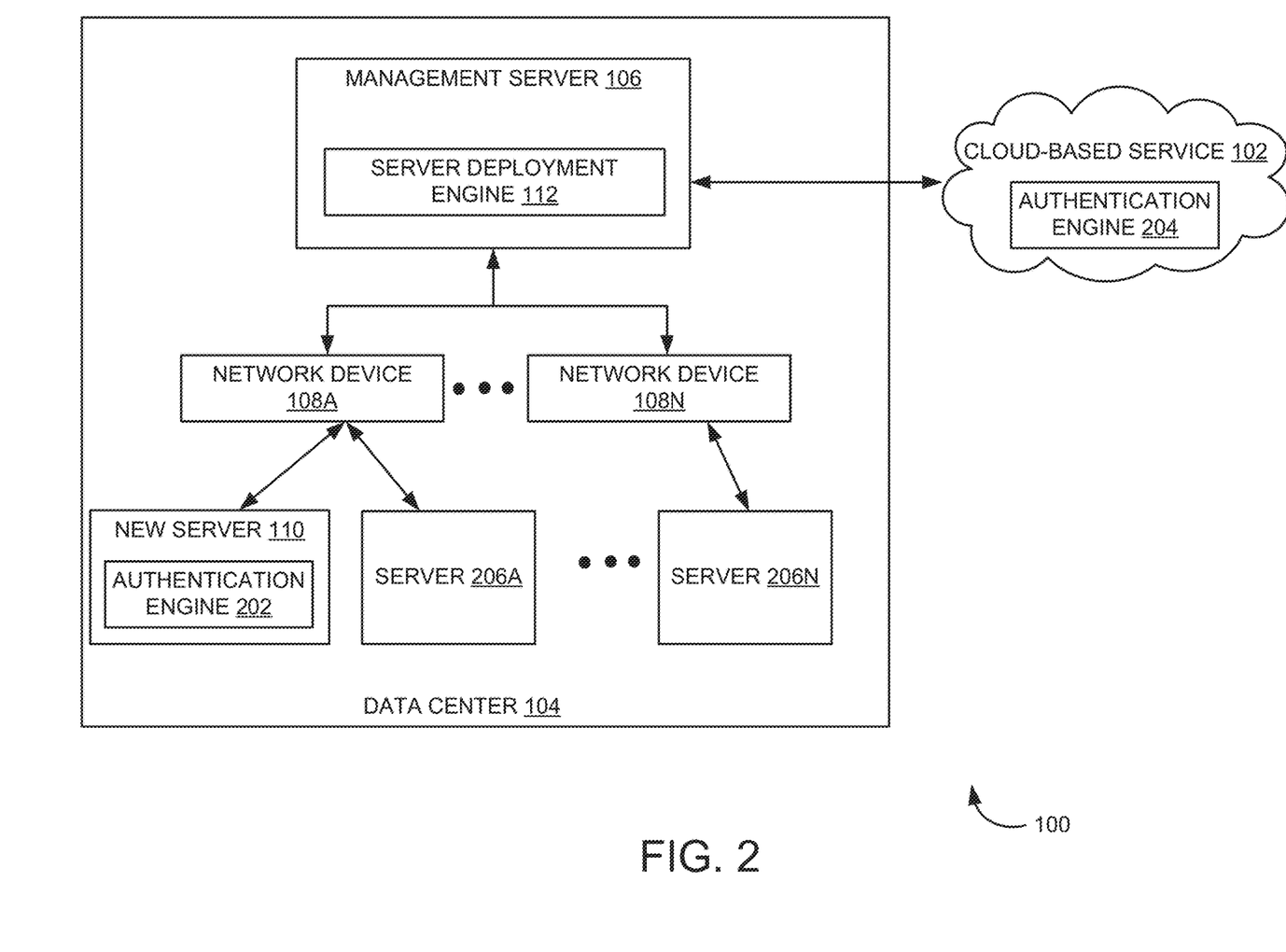
FIG. 2 is a block diagram illustrating additional components of the example system of FIGS. 1A and 1B.

The data center 104 may include a network device 108, the new server 110 connected (e.g., plugged in) to the network device 108, and a management server 106 communicatively connected to the cloud-based service 102 and the network device 108. In the example shown in FIG. 1B, the data center 104 may be described using one network device and one server, however, the data center 104 can include any number of network devices and servers, for example, as shown in FIG. 2.

The management server 106 may include a server deployment engine 112 to automate provisioning of the new server 110 in the data center 104. The server deployment engine 112 may discover the new server 110 in the data center 104, for instance, when the new server 110 is connected/plugged into the network device 108. For example, the server deployment engine 112 may discover the new server 110 that is added to the data center 104 using newly leased dynamic host configuration protocol (DHCP) addresses or upon receiving a request, for instance, from a network administrator. The server deployment engine 112 may obtain a unique identifier (e.g., a serial number, a universally unique identifier, and the like) associated with the new server 110 using a link layer discovery protocol (LLDP) or using a hypertext transfer protocol secure (HTTPS) unauthenticated call that can provide unique identifiers of the new server.

The server deployment engine 112 may establish a trusted connection with the cloud-based service 102 using a trusted certificate. In one example, the cloud-based service 102 may authenticate the server deployment engine 112 using the trusted certificate and then enable to establish the trusted connection. This may be explained in detail in FIG. 2.

The server deployment engine 112 may obtain/download the encrypted data blob associated with the new server 110 from the cloud-based service 102 upon establishing the trusted connection. The encrypted data blob may include a password and device credentials associated with the new server 110. Example device credentials may include a unique identifier, a random number or a combination thereof. In another example, the server deployment engine 112 may obtain an encrypted signed data blob from the cloud-based service 102 in a secure way using the unique identifier associated with the new server 110. The encrypted signed data blob may include the encrypted data blob that may be signed by the cloud-based service 102 using a cloud-based service private key. The encrypted signed data blob may also include authenticated server deployment engine identifiers.

In one example, the new server 110 shipped from factory may have a private/public key pair. In factory mode, the new server 110 may retrieve a data blob with the default password and unique identifiers like a server serial number/ universally unique identifier. The retrieved data blob may be encrypted using a new server specific public key such that the new server 110 with the corresponding private key can decrypt the encrypted data blob. During the manufacturing process, the new server 110 may return the encrypted data blob for storing in the cloud-based service 102. The cloud-based service 102 may expose the encrypted data blob in a secure way to management servers. Further, the cloud-based service 102 may authenticate a management server (e.g., 106) using a trusted certificate associated with the management server 106. Upon authenticating the management server 106, the cloud-based service 102 may sign the encrypted data blob using the cloud-based service owned private key and then return the encrypted signed data blob to the management server 106.

In one implementation, the cloud-based service may sign the encrypted data blob at the time of a request using the private key that is secured using a key management appliance. The cloud-based service may use signing algorithms such as Rivest-Shamir-Adleman (RSA) algorithm with key length $>=3072$, secure hash algorithm (SHA) 256 or greater hashing algorithm, to sign the encrypted data blob. The encrypted signed data blob may include the encrypted data blob (i.e., stored during the factory process) and the authenticated management server identifiers such as public key and the name of the server.

The server deployment engine 112 may send the encrypted signed data blob to the new server 110. For example, the server deployment engine 112 may send the encrypted signed data blob to the new server 110 using the LLDP packets over a network interface. The management server 106 and the new server 110 may exchange communications via LLDP packets to establish the trust in a secure way. The communications between the management server 106 and the new server 110 may be encrypted using public key/private key pair associated with the management server 106 and the new server 110.

Furthermore, the server deployment engine 112 may establish the trust, via a secure protocol, with the new server 110 upon authenticating the encrypted signed data blob by the new server 110. The secure protocol may provide a secure communication between the management server 106 and the new server 110 over a computer network which can be used on the Internet/Intranet. An example secure protocol may include Hyper Text Transfer Protocol Secure (HTTPS).

Authenticating the encrypted signed data blob by the new server 110 is explained in FIG. 2. The server deployment engine 112 may deploy/provision the new server 110 in the data center 104 upon establishing the trust with the new server 110. In one example, the server deployment engine 112 may send a onetime password to the new server 110 upon establishing the trust with the new server 110, where the onetime password may be used to login and deploy the new server 110. In one example, the onetime password may be sent using the LLDP protocol. The server deployment engine 112 may deploy the new server 110 in the data center 104 based on pre-defined rules (e.g., customer-defined rules) and based on configured IP address ranges.

FIG. 2 is a block diagram illustrating additional components of the example system 100 of FIGS. 1A and 1B. In the example shown in FIG. 2, the data center 104 may include multiple network devices 108A-N and servers 110 and 206A-N connected (e.g., plugged in) to corresponding network devices 108A-N. The management server 106 may include the server deployment engine 112 to manage multiple servers 110 and 206A-N in the data center 104. For example, the server 110 may be the newly added server in the data center 104 and servers 206A-N may be servers that are operating in the data center 104.

The server deployment engine 112 may obtain the encrypted signed data blob associated with a new server (e.g., the new server 110) from the cloud-based service 102.

In one example, the cloud-based service 102 may include an authentication engine 204 to receive a request for an encrypted data blob from the server deployment engine 112 and authenticate the trusted certificate associated with the server deployment engine 112. In response to authenticating the server deployment engine 112, the authentication engine 204 may sign the encrypted data blob using a cloud-based service private key and send the encrypted signed data blob to the server deployment engine 112. The server deployment engine 112 may then send the encrypted signed data blob to the new server 110.

Further, the new server 110 may include an authentication engine 202 to receive the encrypted signed data blob from the server deployment engine 112. The authentication engine 202 may verify a signature of the encrypted signed data blob using a corresponding cloud-based service public key shipped with the new server 110. For example, the authentication engine 202 may verify the signature of the encrypted signed data blob to authenticate the cloud-based service 102. The authentication engine 202 may decrypt the encrypted signed data blob using a private key in the new server 110 upon verifying the signature of the encrypted signed data blob. The authentication engine 202 may determine that the decrypted data blob includes a default password and device credentials associated with the new server 110. For example, the authentication engine 202 may compare the default password and device credentials in the decrypted data blob with the default password and device credentials shipped with the new server 110. The authentication engine 202 may enable the server deployment engine 112 to establish the trust with the new server 110 when the default password and device credentials in the decrypted data blob matches with the default password and device credentials shipped with the new server 110.

Once the trust is established, the LLDP encryption may happen using public keys that are exchanged through LLDP packets or when the public key of the management server 106 is signed by the cloud-based service and sent back in the encrypted data blob to the new server 110, the new server 110 can start trusting the communication from the management server 106 with the corresponding public key. For example, the authentication engine 202 may determine that the encrypted signed data blob may be sent by a valid server deployment engine (e.g., 112), and then start sending encrypted LLDP packets over the network interface using the management server public key. The authentication engine 202 may also set a flag to accept LLDP packets from the authenticated server deployment engine and a onetime password. Once the trust is established, the server deployment engine 112 may send a onetime password for a next login that can be used to login to the new server 110 and set up/configure the new server 110.

In another example, the server deployment engine 112 may receive a nonce (e.g., a random number) from the new server 110 using link layer discovery protocol (LLDP) packets, send the nonce to the cloud-based service 102, obtain a signed nonce along with the encrypted data blob from the cloud-based service 102, send the signed nonce along with the encrypted data blob to the new server 110, and establish the trust between the management server 106 and the new server 110 upon successful authentication of the signed nonce and the encrypted data blob by the new server 110.

In one example, the components of the system 100 may be implemented in hardware, machine-readable instructions or a combination thereof. In one example, each of the server deployment engine 112 and the authentication engines 202 and 204 can be any combination of hardware and programming to implement the functionalities described herein. In another example, the functionality of the components of the system 100 may be implemented using a technology related to personal computers (PCs), server computers, tablet computers, mobile computers and the like.

FIGS. 1-2 show a system 100 to deploy a server in the data center 104. The system 100 may include a computer-readable storage medium comprising (e.g., encoded with) instructions executable by a processor to implement functionalities described herein in relation to FIGS. 1-2. In some examples, the functionalities described herein in relation to instructions to implement functions of the server deployment engine 112 and the authentication engines 202 and 204 and any additional instructions described herein in relation to a storage medium, may be implemented as engines or modules comprising any combination of hardware and programming to implement the functionalities of the modules or engines, as described below. The functions of the server deployment engine 112 and the authentication engines 202 and 204 may be implemented by computing devices which may be servers, blade enclosures, desktop computers, laptops (or notebooks) computers, workstations, tablet computers, mobile phones, smart devices, or any other processing devices or equipment including a processing resource. In examples described herein, a processor may include, for example, one processor or multiple processors included in a single computing device or distributed across multiple computing devices.

Figure 3:
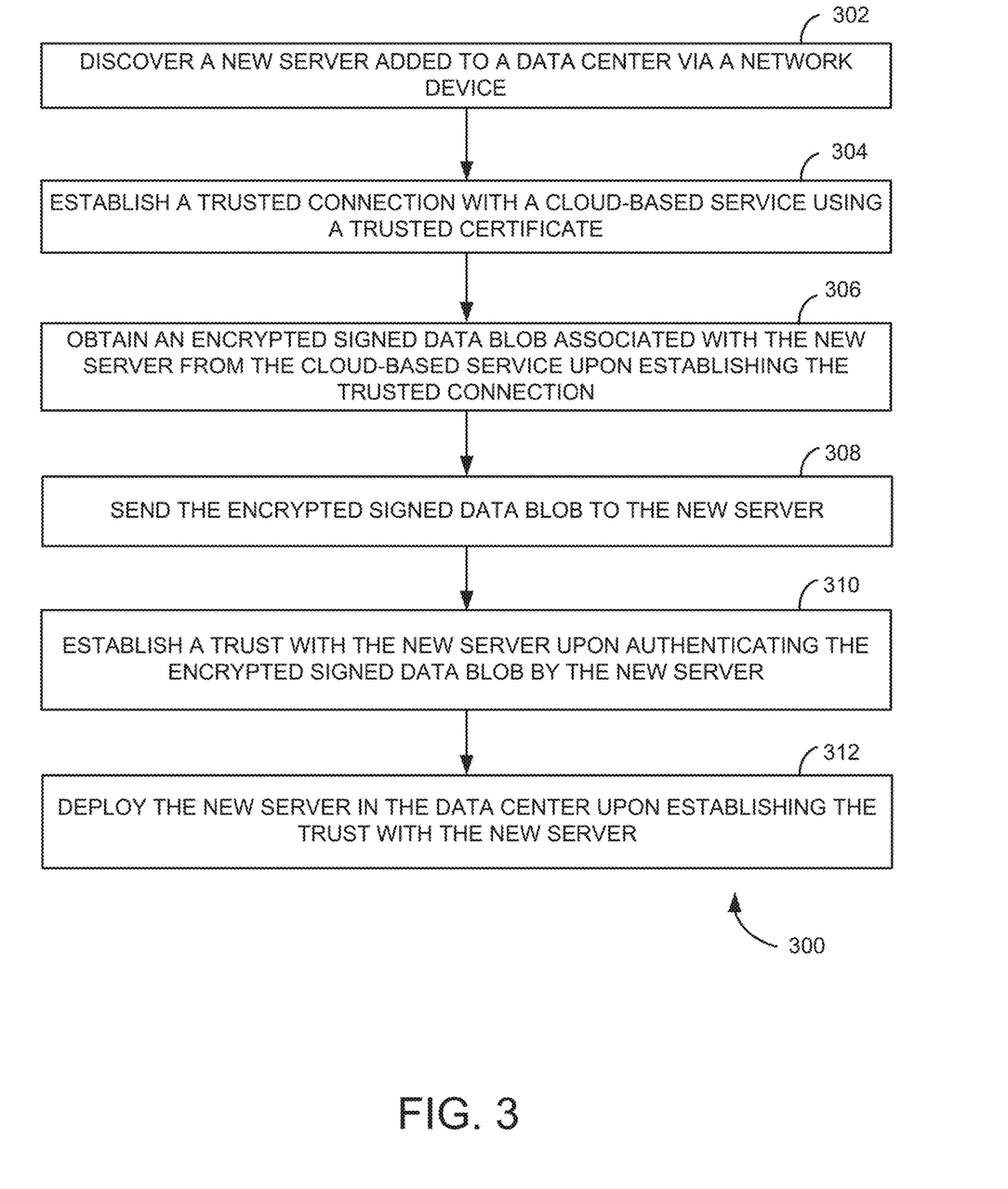
FIGS. 3 and 4 depict example flow charts for establishing a secure trust and deploying a new server in a data center.
Figure 4:
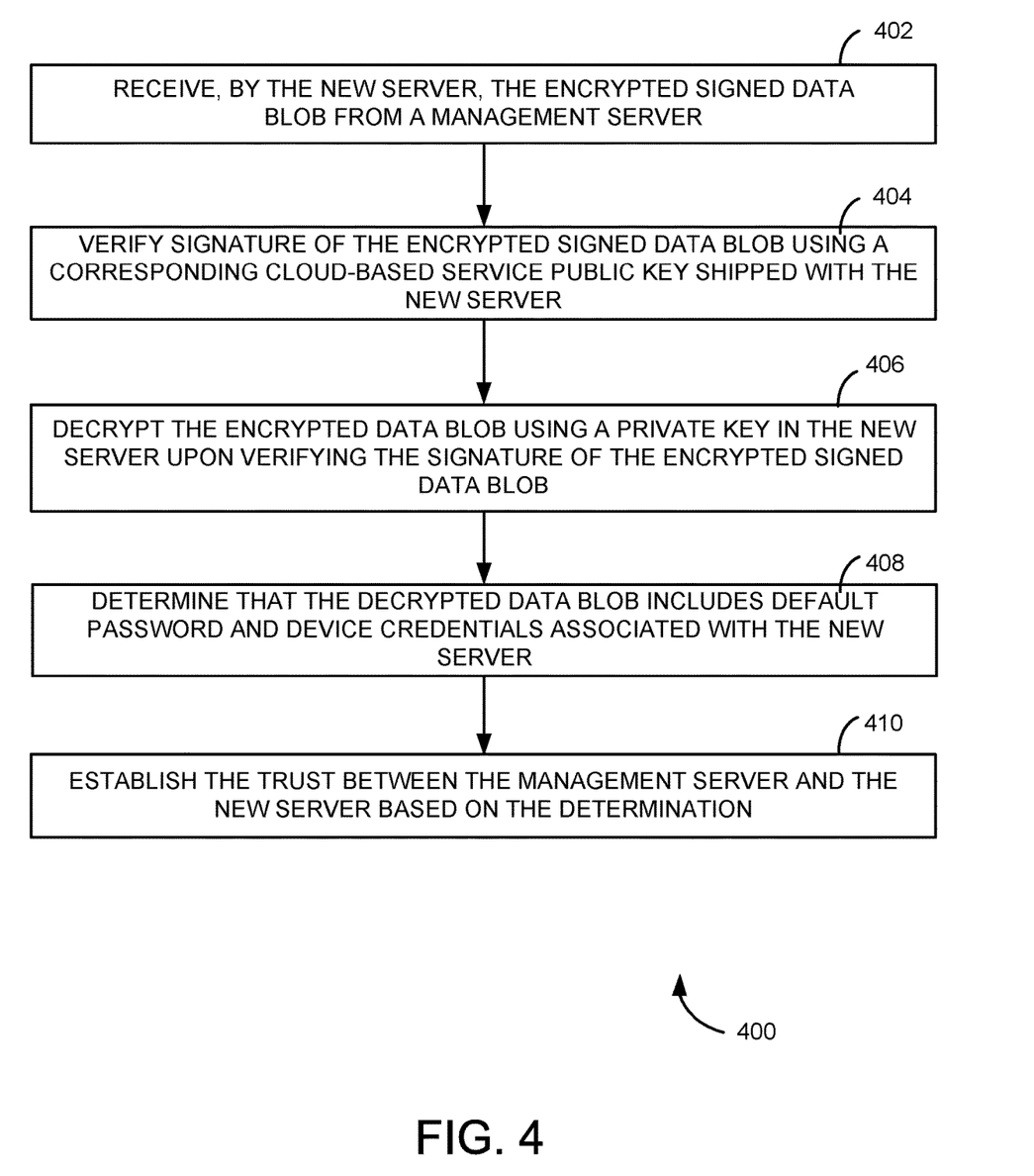

FIGS. 3 and 4 depict example flow charts for establishing a secure trust and deploying a new server in a data center. Particularly, FIG. 3 depicts an example flow chart 300 of a process for automation of a server deployment implemented on a management server. It should be understood the process depicted in FIGS. 3 and 4 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 302, a new server added to a data center may be discovered via a network device connected to the new server, for instance, by a management server. At 304, a trusted connection may be established with a cloud-based service using a trusted certificate. At 306, an encrypted signed data blob associated with the new server may be obtained from the cloud-based service upon establishing the trusted connection.

In one example, the encrypted signed data blob associated with the new server may be obtained from the cloud-based service using a unique identifier associated with the new server. The encrypted signed data blob may include an encrypted data blob signed by the cloud-based service using a cloud-based service private key. The encrypted data blob may include a password and device credentials associated with the new server and the public key of the authenticated management server. Example device credentials may include a unique identifier, a random number or a combination thereof.

At 308, the encrypted signed data blob may be sent to the new server. At 310, a trust may be established with the new server upon authenticating the encrypted signed data blob by the new server. Authenticating the encrypted signed data blob by the new server may be explained in FIG. 4. In one example, in establishing the trust between the management server and the new server, the communications between the management server and the new server may be carried out using link layer discovery protocol (LLDP) packets. In one example, the LLDP packets may be retrieved using the network switch and communicated via the network switch connecting the new server and the management server. For example, the management server can login to the network device (e.g., network switch) and retrieve the LLDP packets that may be sent by the new server to the network device.

At 312, the new server may be deployed in the data center upon establishing the trust with the new server. In one example, a onetime password may be sent to the new server, which can be used to login to the new server to set up the new server.

FIG. 4 depicts an example flow chart 400 of a process for authenticating the encrypted signed data blob implemented on the new server. At 402, the encrypted signed data blob may be received, by the new server, from the management server. At 404, signature of the encrypted signed data blob may be verified using a corresponding cloud-based service public key shipped with the new server. At 406, the encrypted data blob may be decrypted using a private key in the new server upon verifying the signature of the encrypted signed data blob. At 408, a check may be made to determine that the decrypted data blob may include default password and device credentials associated with the new server. At 410, the trust may be established between the management server and the new server based on the determination. In one example, the new server may start to accept requests via LLDP packets sent from the management server via the network switch.

The processes 300 and 400 of FIGS. 3 and 4 may show example processes and it should be understood that other configurations can be employed to practice the techniques of the present application. For example, processes 300 and 400 may communicate with a plurality of computing devices and the like.

Figure 5:
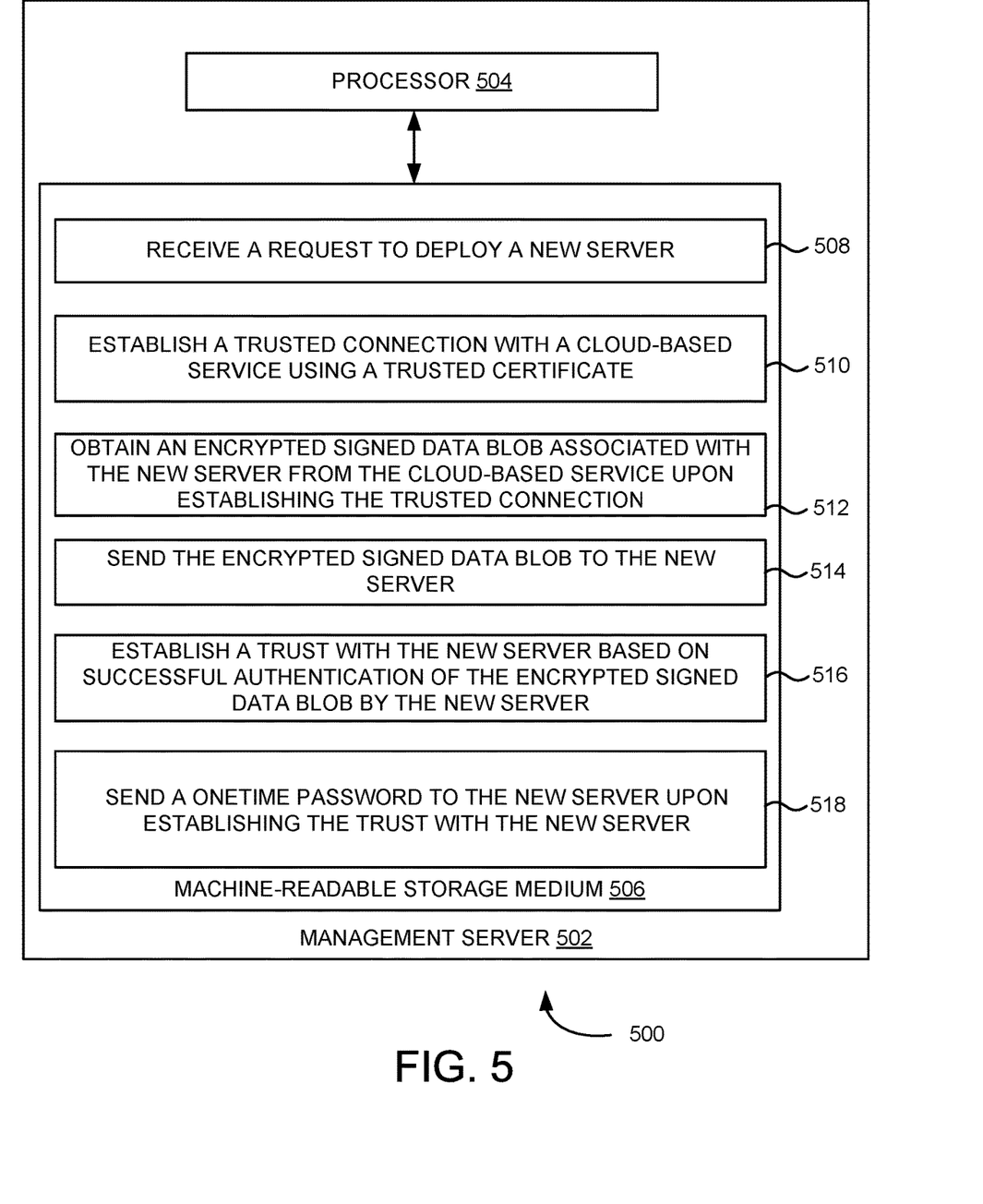
FIGS. 5 and 6 depict example block diagrams showing non-transitory computer-readable media for establishing a secure trust and deploying a new server in a data center.
Figure 6:
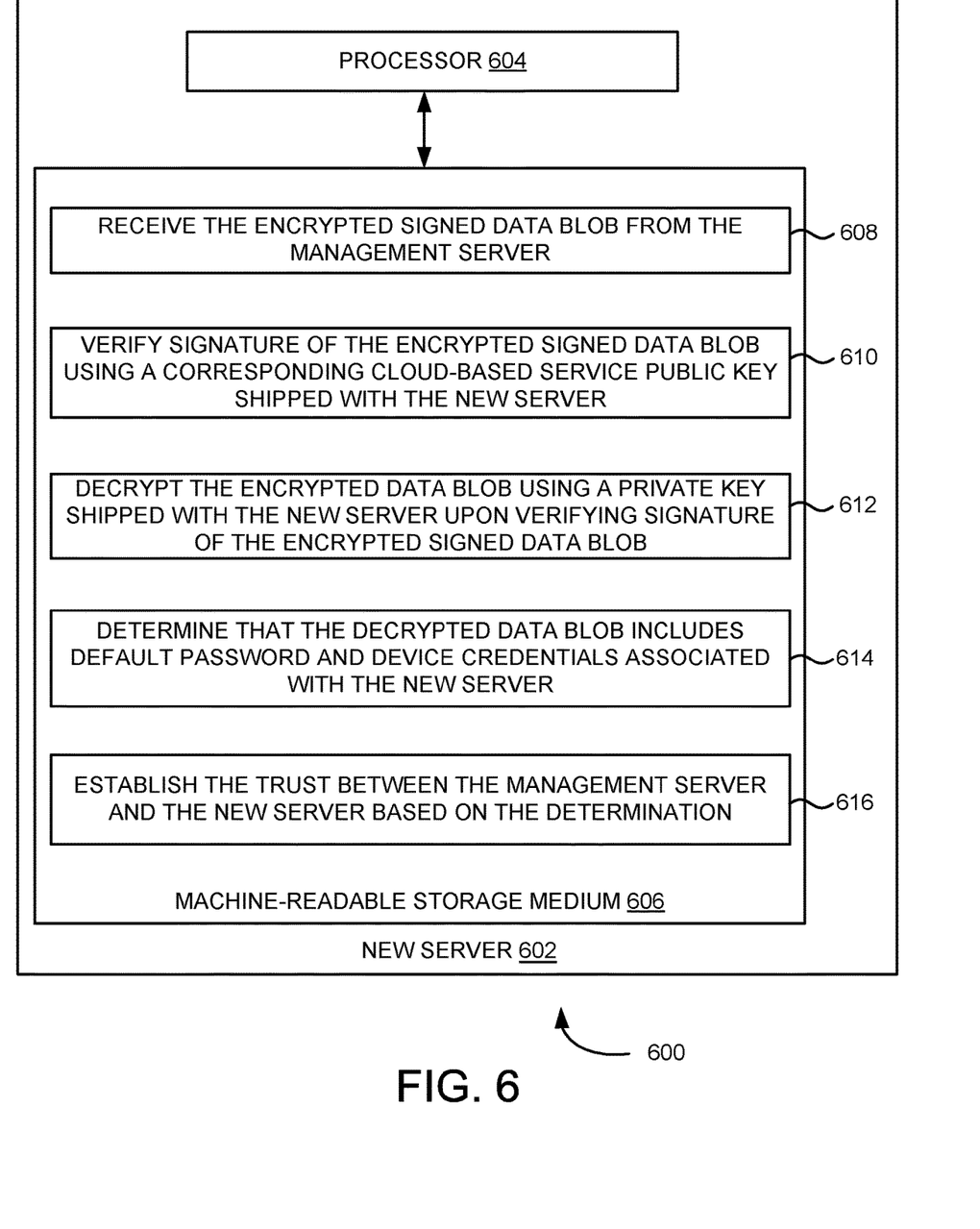

FIGS. 5 and 6 are example block diagrams 500 and 600 showing a non-transitory computer-readable media that stores code for operation in accordance with an example of the techniques of the present application. Particularly FIG. 5 illustrates a management server side implementation of an automation process for a server deployment, and FIG. 6 illustrates a new server side implementation of an automation process for a server deployment. Non-transitory computer-readable media include a machine readable storage medium 506 on the management server 502 side and a machine readable storage medium 606 on the new server 602 side. Non-transitory computer-readable media may be generally referred to by the reference numbers 506 and 606 and may be included in a computing system, such as the management server 502 and/or the new server 602, respectively. Non-transitory computer-readable media 506 and 606 may correspond to any storage device that stores computer-implemented instructions, such as programming code or the like. For example, non-transitory computer-readable media 506 and 606 may include a non-volatile memory, a volatile memory, and/or storage devices. Examples of a non-volatile memory include, but are not limited to, an electrically erasable programmable Read Only Memory (EEPROM) and a Read Only Memory (ROM). Examples of a volatile memory include, but are not limited to, a Static Random Access Memory (SRAM), and a dynamic Random Access Memory (DRAM). Examples of storage devices include, but are not limited to, hard disk drives, compact disc drives, digital versatile disc drives, optical drives, and flash memory devices.

Processors 504 and 604 generally retrieve and execute the instructions stored in non-transitory computer-readable media 506 and 606 respectively, to operate the present techniques in accordance with an example. In one example, the tangible, computer-readable media 506 and 606 can be accessed by the respective one of processors 504 and 604 over a bus.

Machine-readable storage media 506 may store instructions 508-518. In an example, instructions 508-518 may be executed by the processor 504 on the computing device/management server 502 to provide a mechanism for the management server side implementation of the automation process. Instructions 508 may be executed by the processor 504 to receive a request to deploy a new server. Instructions 510 may be executed by the processor 504 to establish a trusted connection with a cloud-based service using a trusted certificate. Instructions 512 may be executed by the processor 504 to obtain an encrypted signed data blob associated with the new server from the cloud-based service upon establishing the trusted connection. The encrypted signed data blob may include a password and device credentials (e.g., serial number, random number, and the like) associated with the new server. Instructions 514 may be executed by processor 504 to send the encrypted signed data blob to the new server. Instructions 516 may be executed by the processor 504 to establish a trust with the new server based on successful authentication of the encrypted signed data blob by the new server. Instructions 518 may be executed by the processor 504 to send a onetime password to the new server upon establishing the trust with the new server, where the onetime password may be used to login and deploy the new server.

Machine-readable storage media 606 may store instructions 608-616. In an example, instructions 608-616 may be executed by the processor 604 on the new server 602 to provide a mechanism for the new server side implementation of the automation process. Instructions 608 may be executed by the processor 604 to receive the encrypted signed data blob from the management server. Instructions 610 may be executed by the processor 604 to verify a signature of the encrypted signed data blob using a corresponding cloud-based service public key shipped with the new server. Instructions 612 may be executed by the processor 604 to decrypt the encrypted data blob using a private key shipped with the new server upon verifying signature of the encrypted signed data blob. Instructions 614 may be executed by the processor 604 to determine that the decrypted data blob includes default password and device credentials associated with the new server. Instructions 616 may be executed by the processor 604 to establish the trust between the management server and the new server based on the determination. Upon establishing the trust, the management server may deploy the new server in the data center using the onetime password.

In another example, machine-readable storage media 506 may include instructions to receive a nonce (e.g., a random number) from the new server in link layer discovery protocol (LLDP) packets, send the nonce to the cloud-based service, obtain a signed nonce along with the encrypted data blob from the cloud-based service, send the signed nonce along with the encrypted data blob to the new server, and establish the trust between the management server and the new server upon successful authentication of the signed nonce and the encrypted data blob by the new server.

Although shown as contiguous blocks, the machine readable instructions can be stored in any order or configuration. For example, if non-transitory computer-readable media 506 and 606 may be a hard drive, the machine readable instructions can be stored in non-contiguous, or even overlapping, sectors.

As used herein, a "processor" may include processor resources such as at least one of a Central Processing Unit (CPU), a semiconductor-based microprocessor, a Graphics Processing Unit (GPU), a Field-Programmable Gate Array (FPGA) to retrieve and execute instructions, other electronic circuitry suitable for the retrieval and execution instructions stored on a computer-readable medium, or a combination thereof. The processor fetches, decodes, and executes instructions stored on computer-readable medium to perform the functionalities described below. In other examples, the functionalities of any of the instructions of computer-readable media 506 and 606 may be implemented in the form of electronic circuitry, in the form of executable instructions encoded on a computer-readable storage medium, or a combination thereof.

As used herein, a "computer-readable medium" may be any electronic, magnetic, optical, or other physical storage apparatus to contain or store information such as executable instructions, data, and the like. For example, any computer-readable storage medium described herein may be any of a Random Access Memory (RAM), a volatile memory, a non-volatile memory, a flash memory, a storage drive (e.g., a hard drive), a solid state drive, any type of a storage disc (e.g., a compact disc, a DVD, etc.), and the like, or a combination thereof. Further, any computer-readable medium described herein may be non-transitory. In examples described herein, a computer-readable medium or media is part of an article (or article of manufacture). An article or article of manufacture may refer to any manufactured single component or multiple components. The medium may be located either in the system executing the computer-readable instructions, or remote from but accessible to the system (e.g., via a computer network) for execution. In the example of FIGS. 5 and 6, each of computer-readable media 506 and 606 may be implemented by one computer-readable medium, or multiple computer-readable media.

In examples described herein, computing systems, such as the management server, the cloud-based service, and/or the new server, may communicate with each other via a network interface device. In examples described herein, a "network interface device" may be a hardware device to communicate over at least one computer network. In some examples, a network interface may be a Network Interface Card (NIC) or the like. As used herein, a computer network may include, for example, a Local Area Network (LAN), a Wireless Local Area Network (WLAN), a Virtual Private Network (VPN), the Internet, or the like, or a combination thereof. In some examples, a computer network may include a telephone network (e.g., a cellular telephone network).

In some examples, instructions may be part of an installation package that, when installed, may be executed by processors 504 and 604 to implement the functionalities described herein in relation to instructions. In such examples, computer-readable media 506 and 606 may be a portable medium, such as a CD, a DVD, or a flash drive, or a memory maintained by a server from which the installation package can be downloaded and installed. In other examples, instructions may be part of an application, applications, or component(s) already installed on computing system 502 and server 602 including processors 504 and 604, respectively. In such examples, computer-readable media 506 and 606 may include memory such as a hard drive, solid state drive, or the like.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on," as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A management server comprising:
   a processor; and
   a non-transitory storage medium storing instructions executable on the processor to:
      discover, using a network device to which the management server is communicatively coupled, a first server in a system;
      obtain, at the management server over a network from a cloud-based service, an encrypted data blob associated with the first server, the encrypted data blob derived based on encryption, using a key, of a data blob comprising a device credential of the first server;
      establish, via a secure protocol, a trusted communication with the first server by sending, from the management server, the encrypted data blob to the first server; and
      provision the first server in the system after establishing the trusted communication with the first server.

2. The management server of claim 1, wherein the instructions are executable on the processor to:
   establish a trusted connection over the network with the cloud-based service using a trusted certificate; and
   obtain the encrypted data blob associated with the first server from the cloud-based service after establishing the trusted connection.

3. The management server of claim 1, wherein the encrypted data blob comprises a unique identifier associated with the first server, wherein the encrypted data blob is signed with a further key of the cloud-based service,
   wherein the sending of the encrypted data blob to the first server is for authentication of the encrypted data blob by the first server, and the establishing of the trusted communication by the management server with the first server is based on the authentication of the encrypted data blob by the first server.

4. The management server of claim 1, wherein the instructions are executable on the processor to provision the first server in the system based on pre-defined rules.

5. The management server of claim 1, wherein the encrypted data blob further comprises a password associated with the first server.

6. The management server of claim 1, wherein the encrypted data blob is signed with a private key of the cloud-based service.

7. The management server of claim 1, wherein the instructions are executable on the processor to, after establishing the trusted communication with the first server, send a onetime password from the management server to the first server to login to the first server to perform the provisioning of the first server.

8. The management server of claim 1, wherein the device credential is to be matched with a credential in the first server.

9. The management server of claim 1, wherein the instructions are executable on the processor to:
   receive, at the management server, a nonce from the first server;
   send the nonce from the management server to the cloud-based service;
   receive, at the management server from the cloud-based service, a signed nonce that is based on the nonce; and
   send the signed nonce from the management server to the first server,
   wherein the establishing of the trusted communication with the first server is further based on the signed nonce.

10. A method comprising:
   discovering, by a management server via a network device to which the management server is communicatively coupled, a first device added to a data center and connected to the network device;
   establishing, by the management server, a trusted connection over a network with a cloud-based service using a trusted certificate;
   obtaining, by the management server through the trusted connection over the network from the cloud-based service, an encrypted signed data blob associated with the first device, wherein the encrypted signed data blob is based on encryption, using a key associated with the first device, of a data blob comprising a device credential of the first device, and wherein the encrypted signed data blob is signed with a private key of the cloud-based service;
   sending, by the management server, the encrypted signed data blob to the first device;
   establishing, by the management server, a trusted communication between the management server and the first device based on the encrypted signed data blob; and
   provisioning, by the management server, the first device in the data center after establishing the trusted communication with the first device.

11. The method of claim 10, further comprising:
   receiving, by the first device, the encrypted signed data blob from the management server;
   verifying, by the first device, a signature of the encrypted signed data blob using a corresponding cloud-based service public key;
   decrypting, by the first device, the encrypted signed data blob using a private key in the first device after the verifying of the signature of the encrypted signed data blob, the decrypting producing a decrypted data blob;
   determining, by the first device, that the decrypted data blob includes a password and the device credential, the password and the device credential being associated with the first device; and
   establishing, by the first device, the trusted communication between the management server and the first device based on the determining.

12. The method of claim 11, wherein the determining that the decrypted data blob includes the password and the device credential comprises comparing, by the first device, the password and the device credential included in the decrypted data blob with a password and device credential stored at the first device.

13. The method of claim 10, wherein the trusted communication comprises communications between the management server and the first device through the network device, the communications comprising link layer discovery protocol (LLDP) packets.

14. The method of claim 10, wherein the provisioning of the first device comprises:
   sending, by the management server, a onetime password to the first device to login, by the management server, to the first device to set up the first device.

15. The method of claim 10, wherein the encrypted signed data blob further comprises a password associated with the first device.

16. A non-transitory machine-readable storage medium comprising instructions that upon execution cause a management server to:
   receive a request to deploy a first server;
   establish a trusted connection over a network with a cloud-based service using a trusted certificate;
   obtain, through the trusted connection over the network from the cloud-based service, an encrypted signed data blob associated with the first server, wherein the encrypted signed data blob comprises an encrypted data blob signed with a key of the cloud-based service, and wherein the encrypted data blob comprises a password and device credentials, the password and the device credentials being associated with the first server and encrypted using a key associated with the first server;
   send the encrypted signed data blob to the first server;
   establish a trusted communication with the first server based on the sending of the encrypted signed data blob to the first server; and
   send a onetime password to the first server after establishing the trusted communication with the first server, to login to and provision the first server.

17. The non-transitory machine-readable storage medium of claim 16, wherein the establishing of the trusted communication with the first server comprises:
   receiving, at the management server, a nonce from the first server in link layer discovery protocol (LLDP) packets, wherein the nonce comprises a random number;
   sending the nonce from the management server to the cloud-based service;

obtaining, at the management server, a signed nonce along with the encrypted signed data blob from the cloud-based service;

sending the signed nonce along with the encrypted signed data blob from the management server to the first server.

18. The non-transitory machine-readable storage medium of claim 16, wherein a device credential of the device credentials is to be matched with a credential in the first server.

19. The non-transitory machine-readable storage medium of claim 16, wherein the instructions upon execution cause the management server to:

receive, at the management server, a nonce from the first server;

send the nonce from the management server to the cloud-based service;

receive, at the management server from the cloud-based service, a signed nonce that is based on the nonce; and send the signed nonce from the management server to the first server, wherein the establishing of the trusted communication with the first server is further based on the signed nonce.

\* \* \* \* \*